United States Patent
Yang et al.

(10) Patent No.: US 9,243,105 B2
(45) Date of Patent: Jan. 26, 2016

(54) COMPLEX METAL OXIDE, AND METHOD OF PREPARING POLYESTER USING THE SAME

(71) Applicant: LOTTE CHEMICAL CORPORATION, Seoul (KR)

(72) Inventors: Young Keun Yang, Daejeon (KR); Seung Woong Yoon, Daejeon (KR); Yong Taek Hwang, Daejeon (KR); Kyung Ho Lim, Ulsan (KR); Jong Ho Bae, Ulsan (KR)

(73) Assignee: LOTTE CHEMICAL CORPORATION (KR)

( * ) Notice: Subject to any disclaimer, the term of this patent is extended or adjusted under 35 U.S.C. 154(b) by 0 days.

(21) Appl. No.: 14/391,804

(22) PCT Filed: Apr. 10, 2013

(86) PCT No.: PCT/KR2013/003005
§ 371 (c)(1),
(2) Date: Oct. 10, 2014

(87) PCT Pub. No.: WO2013/154351
PCT Pub. Date: Oct. 17, 2013

(65) Prior Publication Data
US 2015/0051366 A1  Feb. 19, 2015

(30) Foreign Application Priority Data

Apr. 13, 2012 (KR) ........................ 10-2012-0038477

(51) Int. Cl.
| C08G 63/02 | (2006.01) |
| C08G 63/85 | (2006.01) |
| C08G 63/82 | (2006.01) |
| C08G 63/181 | (2006.01) |
| C08G 63/183 | (2006.01) |
| C08G 63/80 | (2006.01) |

(52) U.S. Cl.
CPC .............. *C08G 63/85* (2013.01); *C08G 63/181* (2013.01); *C08G 63/183* (2013.01); *C08G 63/80* (2013.01); *C08G 63/82* (2013.01); *C08G 63/826* (2013.01)

(58) Field of Classification Search
CPC ................................ C08G 63/78; C08G 67/04
USPC ......... 502/6, 66, 76, 159, 205, 212, 302, 304; 528/271, 272, 279
See application file for complete search history.

(56) References Cited

U.S. PATENT DOCUMENTS

| 6,346,070 B1 | 2/2002 | Ohmatsuzawa et al. |
| 6,372,879 B1 | 4/2002 | Dowling et al. |
| 8,404,418 B2 * | 3/2013 | Kunii et al. ................. 430/108.6 |
| 2007/0225469 A1 | 9/2007 | Akita et al. |
| 2010/0094039 A1 | 4/2010 | Ooms |

FOREIGN PATENT DOCUMENTS

| CN | 101525429 | 9/2009 |
| JP | S58-210847 | 12/1983 |
| JP | H05-092137 | 4/1993 |
| JP | 2000-086246 | 3/2000 |
| JP | 2008-063384 | 3/2008 |
| JP | 2009-046593 | 3/2009 |
| KR | 10-0415632 | 3/2004 |
| KR | 10-0697027 B1 | 3/2007 |
| KR | 10-1110628 B1 | 2/2012 |
| KR | 10-2012-0022422 | 3/2012 |
| KR | 10-2012-0022422 A | 3/2012 |
| WO | WO 95/18839 | 7/1995 |
| WO | WO 95/20184 | 7/1995 |

OTHER PUBLICATIONS

Finelli et al., "Comparison Between Titanium Tetrabutoxide and a New Commercial Titanium Dioxide Based Catalyst Used for the Synthesis of Poly(Ethylene Terephthalate)," J. Applied Polymer Sci., 2004, vol. 92, pp. 1887-1892.

Kissin, "Examples of catalysts for polymerization of ethylene and for copolymerization of ethylene with higher 1-alkenes," Chapter 1, Section 1.2.3.2, pp. 8-9, of "Alkene Polymerization Reactions with Transition Metal Catalysts," Elsevier, 2008, 3 pages.

Shotyk et al., "Contamination of Canadian and European bottled waters in antimony from PET containers," J. Environ. Monitoring, 2006, vol. 8, pp. 288-292.

Velikova et al., "Effect of carrier nature and monomer pressure on polymerization of ethylene with high activity catalyst system," Polymer Bull., 2000, vol. 44, pp. 203-208.

International Search Report prepared by the Korean Intellectual Property Office on Jul. 11, 2013, for International Application No. PCT/KR2013/003005.

Rui et al. "Fabrication of Al2(1-x)MgxTi1+xO5 Composite Poder by Chemical Co—Precipitation," Guisuanyan Tongbao Bianjibu, 2005, vol. 24, No. 3, pp. 89-92 (English abstract).

* cited by examiner

*Primary Examiner* — Terressa Boykin
(74) *Attorney, Agent, or Firm* — Sheridan Ross P.C.

(57) ABSTRACT

Disclosed herein are a novel complex metal oxide catalyst, and a method of preparing polyester using the same. The metal-bound compound of the present invention has a higher catalytic activity as compared to an antimony catalyst and existing titanium catalysts to be easily synthesized and stabilized, have a sufficient polymerization activity even with a small amount, and be used as an environmentally friendly catalyst for polyester polymerization. In addition, when preparing polyester by using the complex metal oxide of the present invention, since catalytic activity caused by phosphorus (P) which is a thermal stabilizer used to decrease pyrolysis at the time of hot-melting and molding is not deteriorated, an excessive amount of phosphorus may be used as compared to the related art, such that pyrolysis less occurs, whereby the yellowing phenomenon may be decreased and high viscosity may be maintained. Therefore, the complex metal oxide may be usefully applied to the preparation of polyester having good physical properties, in particular, polyethylene terephthalate.

21 Claims, 1 Drawing Sheet

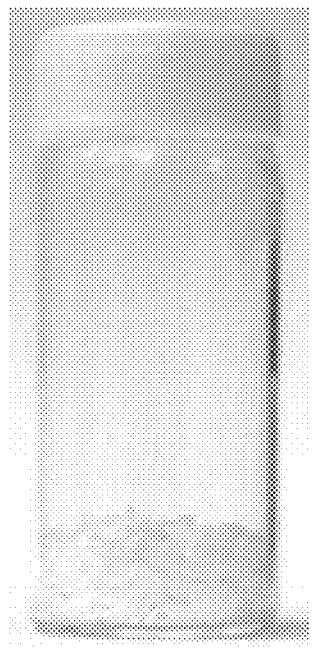

COMPLEX METAL OXIDE, AND METHOD OF PREPARING POLYESTER USING THE SAME

CROSS REFERENCE TO RELATED APPLICATIONS

This application is a national stage application under 35 U.S.C. 371 and claims the benefit of PCT Application No. PCT/KR2013/003005 having an international filing date of Apr. 13, 2013, which designated the United States, which PCT application claimed the benefit of Korean Patent Application No. 10-2012-0038477 filed on Apr. 13, 2012, the disclosure of both the above-identified applications are incorporated herein by reference.

BACKGROUND OF THE INVENTION (a) Field of the Invention

The present invention relates to a complex metal oxide, and a method of preparing polyester using the same. More particularly, the present invention relates to a complex metal oxide including three kinds of metal and having a stabilized structure to be capable of being used as a catalyst for polyester polymerization, and a method of preparing polyester using the same.

This application claims the benefit of Korean Patent Application No. 2012-0038477 filed in the Korean Intellectual Property Office on Apr. 13, 2012, the entire contents of which are incorporated herein by reference.

(b) Description of the Related Art

Polyester has been applied to various fields, for example, a beverage filling container, a medical packaging material, a sheet, a film, and a car molded product which have been applied from the related art, due to excellent mechanical properties and chemical properties. Representative example thereof includes polyethylene terephthalate. The polyethylene terephthalate has been widely used due to excellent physical and chemical properties, dimensional stability, and the like, and is mainly prepared by using an antimony (Sb)-based catalyst.

However, in the case of products manufactured by the antimony-based catalyst, a large amount of antimony needs to be used in polymerization process, and the antimony itself has toxicity, such that at the time of using the products for a long time, the antimony may leak and may be introduced in vivo, causing deterioration of fetal growth, diseases such as carcinogenicity, and the like, and leading to environmental problems (Appl. Polym. Sci. 2004, 92, 1887). In accordance with the recent research results, it is known that even in a drinking water bottle, and a food packaging material manufactured by using the antimony catalyst, a large amount of antimony causing toxicity in vivo is detected (J Environ. Monit. 2006, 8, 288). Accordingly, in some advanced countries, regulation or ban on the use of the antimony-based catalyst has gradually proceeded, and an environmentally friendly catalyst capable of substituting for a toxicity-inducing metal such as antimony has been developed.

Regarding this, methods of using a metal compound capable of substituting for a highly toxic antimony-based catalyst, and having a low toxicity in vivo, and known as being environmentally friendly, as a catalyst for polyester polymerization, have been suggested.

For example, International Publication Patent No. WO95/018839 discloses a catalyst preparing polyester and copolyester by using $TiO_2/SiO_2$ or $TiO_2/ZrO_2$ oxide coprecipitate. In addition, Japanese Patent Laid-Open Publication No. 2003-40991 suggested a method of polymerizing polyester by using a complex oxide such as $TiO_2/Al_2O_3$, $TiO_2/SiO_2$ or $TiO_2/ZrO_2$ as a catalyst.

However, the catalysts used in the above-described methods have a limitation in that a small amount of phosphorus (P) should be used as an additive serving as a thermal stabilizer and an antioxidant used in the polymerization process of the polyester, such that during the melting and molding process, it is easy to cause pyrolysis, oxidation degradation and a yellowing problem of polyester. Therefore, at the time of manufacturing a film and a drinking water container using the polyethylene terephthalate polymerized by using the existing complex oxide catalyst, since the yellowing problem occurs, the product has a darkened brightness, which is not appropriate for commercialization. In addition, since activity of the catalyst itself is not controllable in the polycondensation, polymer having a large distribution of molecular weight is prepared, such that it is difficult to obtain polyester having a desired viscosity in a solid phase polymerization.

Therefore, development of a catalyst capable of being environmentally friendly and stabilized with phosphorus, and having few problems such as pyrolysis, oxidation degradation, and yellowing problem at the time of utilizing molded products manufactured by using a resin obtained by polyester polymerization using the catalyst, has been still demanded.

SUMMARY OF THE INVENTION

The present invention has been made in an effort to provide a complex metal oxide capable of having a higher catalytic activity as compared to an antimony catalyst and existing titanium catalysts, being easily synthesized and stabilized, having a sufficient polymerization activity even with a small amount, and being used as an environmentally friendly catalyst for polyester polymerization.

In addition, the present invention has been made in an effort to provide a method of preparing polyester by using the complex metal oxide.

An exemplary embodiment of the present invention provides a complex metal oxide used as a catalyst for polyester polymerization, including: one kind of a metal (M) selected from the group consisting of magnesium (Mg), zinc (Zn), copper (Cu), manganese (Mn), calcium (Ca), and iron (Fe), and titanium (Ti) and aluminum (Al).

The complex metal oxide may be titanium alkoxide represented by the following Chemical Formula 1, aluminum alkoxide represented by the following Chemical Formula 2, and a coprecipitate of a metal alkoxide represented by the following Chemical Formula 3:

$Ti(OR^1)_4$  [Chemical Formula 1]

$Al(OR^2)_3$  [Chemical Formula 2]

$M(OR^3)_2$  [Chemical Formula 3]

in Chemical Formulas 1, 2 and 3, $R^1$, $R^2$, and $R^3$ are each independently, identically or differently, a hydrogen atom or $C_1$ to $C_{20}$ alkyl, $C_2$ to $C_{20}$ alkenyl, $C_3$ to $C_{20}$ cycloalkyl, $C_6$ to $C_{20}$ aryl, $C_1$ to $C_{20}$ alkylsilyl, $C_7$ to $C_{20}$ arylalkyl or $C_7$ to $C_{20}$ alkylaryl, and in Chemical Formula 3, M is one kind selected from the group consisting of Mg, Zn, Cu, Mn, Ca, and Fe.

Another embodiment of the present invention provides a method of preparing polyester including: polymerizing a dicarboxylic acid component including terephthalic acid and a glycol component in the presence of a complex metal oxide including one kind of a metal (M) selected from the group consisting of magnesium (Mg), zinc (Zn), copper (Cu), manganese (Mn), calcium (Ca), and iron (Fe), and titanium (Ti) and aluminum (Al).

The composite metal oxide of the present invention may polymerize polyester even with a small amount, which is significantly useful as an environmentally friendly catalyst for next generation.

In addition, when preparing polyester by using the complex metal oxide of the present invention, since deterioration in catalytic activity caused by phosphorus (P) which is a thermal stabilizer used to decrease pyrolysis at the time of hot-melting and molding is hardly shown, an excessive amount of phosphorus may be used as compared to the related art, such that pyrolysis less occurs, whereby the yellowing phenomenon may be decreased and high viscosity may be maintained.

Further, a polyester resin using polyester obtained by the method of preparing the polyester, in particular, polyethylene terephthalate, has excellent physical properties such as transparency, viscosity, brightness, chromaticity, and the like, to be usefully applied to drinks and a food-related container, and the like.

BRIEF DESCRIPTION OF THE DRAWINGS

FIG. 1 is a photograph of a complex metal oxide obtained by Example 1 of the present invention.

DETAILED DESCRIPTION OF THE EMBODIMENTS

A complex metal oxide of the present invention may be used as a catalyst for polyester polymerization, including: one kind of a metal (M) selected from the group consisting of magnesium (Mg), zinc (Zn), copper (Cu), manganese (Mn), calcium (Ca), and iron (Fe), and titanium (Ti) and aluminum (Al).

In addition, a method of preparing polyester of the present invention includes: polymerizing a dicarboxylic acid component including terephthalic acid and a glycol component in the presence of the complex metal oxide.

The terminology used herein is for the purpose of describing embodiments only and is not intended to be limiting of the present invention. As used herein, the singular forms are intended to include the plural forms as well, unless the context clearly indicates otherwise. It will be further understood that the terms "comprises", "provides" or "having", used in this specification, specify the presence of stated features, integers, steps, components, or combinations thereof, but do not previously exclude the presence or addition of one or more other features, integers, steps, components, or combinations thereof.

Although the present invention can be modified variously and have several embodiments, the specific embodiments are exemplified and will be described in detail in the detailed description. However, the present invention is not limited to the specific embodiments and should be construed as including all the changes, equivalents, and substitutions included in the spirit and scope of the present invention.

Hereinafter, the complex metal oxide of the present invention, and the method of preparing the polyester using the same, will be described in detail.

Complex Metal Oxide

The complex metal oxide of the present invention contains one kind of a metal (M) selected from the group consisting of magnesium (Mg), zinc (Zn), copper (Cu), manganese (Mn), calcium (Ca), and iron (Fe), and titanium (Ti) and aluminum (Al).

The complex metal oxide of the present invention may be used when polymerizing polyester, and in particular, may be used as a catalyst for preparing polyethylene terephthalate.

The complex metal oxide capable of being used as a catalyst for polyester polymerization or a coprecipitate thereof has been suggested.

However, the known complex metal oxides do not have sufficient activity when being actually applied to the polyester polymerization. In addition, during the polyester polymerization, a phosphoric compound containing phosphorus (P) as an additive serving as a thermal stabilizer and an antioxidant is required to be used. However, the existing complex metal oxide catalysts has a decreased activity when being used with phosphorus, thereby having a limitation in that the phosphorus should be used with a small amount. Therefore, since the small amount of phosphorus is used, pyrolysis, oxidation degradation and a yellowing problem of polyester easily occur at the time of melting and molding, thereby having a limitation in being applied.

According to an exemplary embodiment of the present invention, the complex metal oxide may be titanium alkoxide represented by the following Chemical Formula 1, aluminum alkoxide represented by the following Chemical Formula 2, and a coprecipitate of a metal alkoxide represented by the following Chemical Formula 3:

$$Ti(OR^1)_4 \quad \text{[Chemical Formula 1]}$$

$$Al(OR^2)_3 \quad \text{[Chemical Formula 2]}$$

$$M(OR^3)_2 \quad \text{[Chemical Formula 3]}$$

in Chemical Formulas 1, 2 and 3, $R^1$, $R^2$, and $R^3$ are each independently, identically or differently, a hydrogen atom or $C_1$ to $C_{20}$ alkyl, $C_2$ to $C_{20}$ alkenyl, $C_3$ to $C_{20}$ cycloalkyl, $C_6$ to $C_{20}$ aryl, $C_1$ to $C_{20}$ alkylsilyl, $C_7$ to $C_{20}$ arylalkyl or $C_7$ to $C_{20}$ alkylaryl, and in Chemical Formula 3, M is one kind selected from the group consisting of Mg, Zn, Cu, Mn, Ca, and Fe.

According to an exemplary embodiment of the present invention, $R^1$, $R^2$, and $R^3$ may be each independently, identically or differently, a hydrogen atom or $C_1$ to $C_4$ alkyl, and M is Mg.

According to an exemplary embodiment of the present invention, the complex metal oxide may be obtained by the following Reaction Formulas 1 to 3.

First, a titanium-aluminum complex oxide may be prepared as a single molecule or an oligomer form, by mixing titanium alkoxide represented by Chemical Formula 1 above with aluminum alkoxide represented by Chemical Formula 2 above in the presence of water and ethanol, as shown in the following Reaction Formula 1:

[Reaction Formula 1]

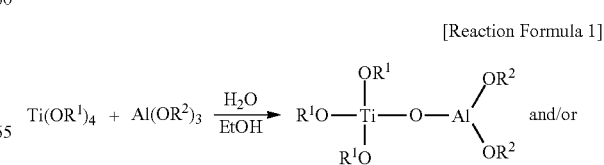

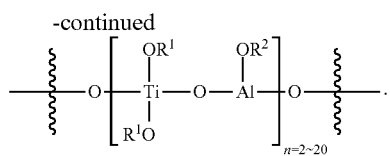

Then, according to the following Reaction Formula 2, a metal alkoxide is injected into a reaction product obtained by Reaction Formula 1 above, such that titanium (Ti)-aluminum (Al)-metal (M)-oxygen may be alternately bound to each other, and a metal alkoxide structure having a stable hexagon may be formed.

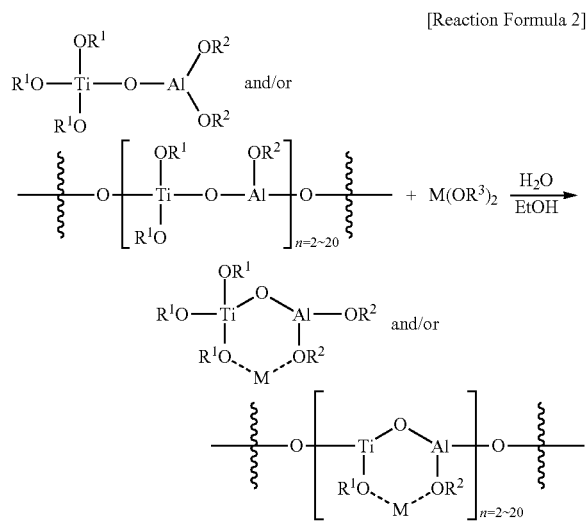

[Reaction Formula 2]

An excessive amount of water is added to the reaction product obtained by Reaction Formula 2 above to substitute functional groups and alcohol groups bound to titanium and aluminum by hydrolysis, thereby preparing a single molecule or an oligomer of the complex metal oxide including a hexagonal ring having a stable structure in which Ti, Al, metal, and oxygen are alternately connected to each other as shown in the following Reaction Formula 3:

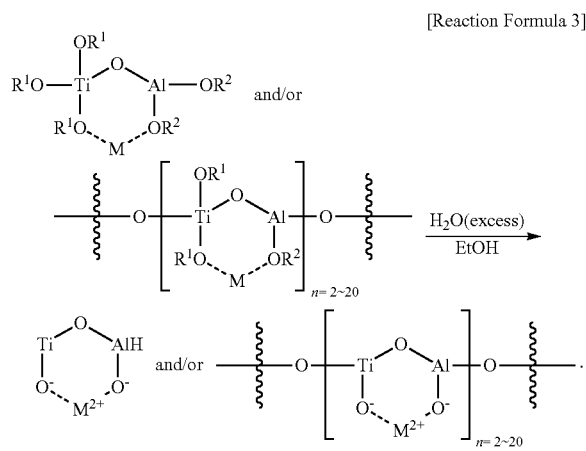

[Reaction Formula 3]

The reaction products obtained by Reaction Formulas 1 to 3 above are obtained by adding solvents such as water and ethanol to the titanium alkoxide, the aluminum alkoxide, and the metal alkoxide, to be precipitated as a complex metal oxide, which may be referred to as a coprecipitate.

According to an exemplary embodiment of the present invention, the titanium alkoxide, the aluminum alkoxide, and the metal alkoxide are not particularly limited in view of a used amount, but for example, may be reacted at a ratio of about 10:1:1 to about 1:1:1 based on a molar ratio of Ti, Al and M.

According to an exemplary embodiment of the present invention, when the metal (M) is magnesium (Mg), the complex metal oxide may be represented by the following Chemical Formula 4 or the following Chemical Formula 5:

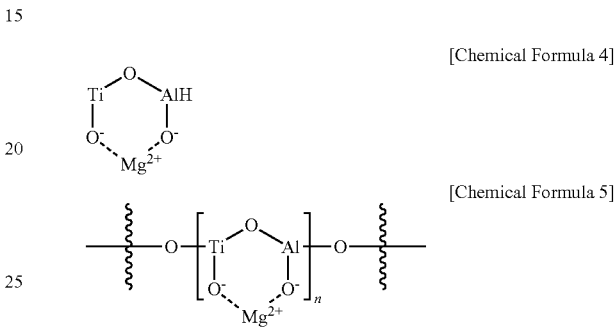

[Chemical Formula 4]

[Chemical Formula 5]

in Chemical Formula 5, n is an integer of 2 to 20.

As described above, in accordance with Reaction Formulas 1 to 3 above, the complex metal oxide of the present invention may be synthesized in one step reaction by dissolving metal alkoxides such as titanium alkoxide, aluminum alkoxide, and magnesium alkoxide, in the presence of ethanol, and adding water mixed with ethanol thereto at room temperature, and then may be easily obtained by simple purification processes such as removal of solvent, and the like.

The complex metal oxide catalyst having the titanium, the aluminum, and other metals bound thereto of the present invention as described above may be prepared by a relatively simple method, and even though an excessive amount of phosphoric compound serving as a thermal stabilizer is used at the time of performing a polyester polymerization process, a catalytic activity is maintained, which is unlike the existing titanium catalyst, such that pyrolysis phenomenon does not occur in solid-phase polymerization, thereby preventing an increase in viscosity of the polyester resin and the yellowing problem.

In addition, the complex metal oxide according to the present invention is stable against moisture, such that the storage is easy. Therefore, at the time of mass-production of polyester, in particular, production of polyethylene terephthalate, the complex metal oxide is commercially applied.

In the complex metal oxide of the present invention, unlike antimony-based catalysts, the metal itself has relatively low toxicity to have a low possibility of causing problems to human and environment, and high activity is shown with a small amount in a short reaction time as compared to the existing antimony-based catalyst. In addition, polyester prepared by using the catalyst for polyester polymerization containing the complex metal oxide of the present invention has excellent physical properties such as viscosity and color.

Method of Preparing Polyester

The method of preparing the polyester of the present invention includes polymerizing a dicarboxylic acid component including terephthalic acid and a glycol component in the presence of a complex metal oxide catalyst including one kind of a metal (M) selected from the group consisting of magnesium (Mg), zinc (Zn), copper (Cu), manganese (Mn), calcium (Ca), and iron (Fe), and titanium (Ti) and aluminum (Al).

The polymerizing of the polyester may be performed by liquid phase polymerization or solid phase polymerization.

According to an exemplary embodiment of the present invention, the polymerizing of the dicarboxylic acid component including the terephthalic acid and the glycol component may include: esterifying the dicarboxylic acid component including the terephthalic acid and the glycol component; and polycondensing a reaction product obtained by the esterification reaction.

More specifically, the esterifying of the dicarboxylic acid component including the terephthalic acid and the glycol component may be performed.

According to an exemplary embodiment of the present invention, an example of the dicarboxylic acid component may include terephthalic acid, oxalic acid, malonic acid, azelaic acid, fumaric acid, pimelic acid, suberic acid, isophthalic acid, dodecane dicarboxylic acid, naphthalene dicarboxylic acid, biphenyldicarboxylic acid, 1,4-cyclohexane dicarboxylic acid, 1,3-cyclohexane dicarboxylic acid, succinic acid, glutaric acid, adipic acid, sebacic acid, 2,6-naphthalene dicarboxylic acid, 1,2-norbornane dicarboxylic acid, 1,3-cyclohexane dicarboxylic acid, 1,4-cyclohexane dicarboxylic acid, 1,3-cyclobutane dicarboxylic acid, 1,4-cyclohexane dicarboxylic acid, 5-sodium sulfoisophthalic acid, 5-potassium sulfoisophthalic acid, 5-lithium sulfoisophthalic acid, 2-sodium sulfoterephthalic acid, or the like, but the present invention is not particularly limited thereto, and other dicarboxylic acids may be used within a range not hindering the object of the present invention.

According to an exemplary embodiment of the present invention, an example of the glycol component may include ethylene glycol, 1,2-propylene glycol, 1,2-butylene glycol, 1,3-butylene glycol, 2,3-butylene glycol, 1,4-butylene glycol, 1,5-petanediol, neopentyl glycol, 1,3-propylene glycol, diethylene glycol, triethylene glycol, 1,2-cyclohexane diol, 1,3-cyclohexane diol, 1,4-cyclohexane diol, propane diol, 1,6-hexane diol, neopentyl glycol, tetramethylcyclobutane diol, 1,4-cyclohexane diethanol, 1,10-decamethylene glycol, 1,12-dodecane diol, polyoxyethylene glycol, polyoxymethylene glycol, polyoxytetramethylene glycol, glycerol, or the like, but the present invention is not particularly limited thereto, and other glycol may be used within a range not hindering the object of the present invention. Preferably, ethylene glycol may be used as the glycol component.

According to an exemplary embodiment of the present invention, the esterifying of the dicarboxylic acid component including the terephthalic acid or an ester-forming derivative and the glycol component may be performed at a temperature of about 200 to about 300° C., preferably, about 230 to about 280° C., for about 1 to about 6 hours, preferably, for about 2 to about 5 hours.

Then, the polycondensing of the reaction product obtained by the esterification may be performed.

The polycondensing of the reaction product obtained by the esterification reaction may be performed at a temperature of about 200 to about 300 t, preferably, about 260 to about 290° C., and under a reduced pressure of about 0.1 to about 1 torr, for about 1 to about 5 hours, preferably, about 1 and a half to about 4 hours.

In the method of preparing the polyester of the present invention, the complex metal oxide used as a catalyst may include one kind of a metal (M) selected from the group consisting of magnesium (Mg), zinc (Zn), copper (Cu), manganese (Mn), calcium (Ca), and iron (Fe), and titanium (Ti) and aluminum (Al), and detailed explanation thereof is the same as described above.

The complex metal oxide may be injected during any steps of the polyester polymerization. For example, the complex metal oxide may be injected during only the esterification reaction, or during only the polycondensation of the reaction product obtained by the esterification reaction, or during both of the esterification reaction and the polycondensation, wherein there is no significant difference in catalytic activity.

The complex metal oxide may be injected so that titanium (Ti), aluminum (Al), and metal (M) contained in the complex metal oxide have a total content of about 5 to about 200 ppm, preferably, about 7 to about 100 ppm, more preferably, about 10 to about 50 ppm, based on a weight of the finally prepared polyester. When titanium, aluminum, and metal have a total content less than 5 ppm, it is difficult to show sufficient catalytic activity, and when titanium, aluminum, and metal have a total content more than 200 ppm, it is difficult to improve the yellowing even with a toning agent such as an organic dye, and the cost is increased as compared to the antimony catalyst.

According to an exemplary embodiment of the present invention, a thermal stabilizer may be injected into the polycondensation to thereby decrease pyrolysis of the polyester.

The thermal stabilizer inhibits production of colorbody occurred by reverse reaction or a degradation reaction product decreasing molecular chains due to heat applied to esterification exchange reaction and polycondensation reaction, additionally occurred reaction heat, friction heat occurred by stirring, and the like, or controls a catalytic activity to inhibit unintended additional reaction, and inhibits the yellowing of the finally formed polyester, such that a polymer is transparent and is almost colorless.

Accordingly, in order to increase color stability in products such as a food packing material, a drinking water container, and the like, in which colorlessness and transparency are generally emphasized, a phosphoric compound is used as a thermal stabilizer, wherein the thermal stabilizer reacts with materials inhibiting polycondensation such as water, alcoholic compound, radical product, and the like, occurred as a residue in the reaction, to inhibit an additional reaction. In addition, when using representative titanium-based and transitional metal as a catalyst, in a polyester polycondensation process, organic materials occurred at a high temperature and residual metal are bound to each other to induce the yellowing to the polyester product. In this case, when using the phosphoric compound as the thermal stabilizer, a number of metals are coupled with phosphorus to form heteropoly acid, thereby blocking metal impurities.

Further, by using the thermal stabilizer, pyrolysis may be prevented in a long-time solid phase polymerization such as a plant process, such that viscosity of polyester may be increased, and the yellowing may be prevented. However, the titanium catalyst easily reacts with the phosphoric compound mainly used as the thermal stabilizer, such that the catalytic activity may be deteriorated. Therefore, in order to overcome the deterioration, it is general to inject the thermal stabilizer and the catalyst with a predetermined time interval. However, in the case of the complex metal oxide catalyst of the present invention, even though the thermal stabilizer such as the phosphoric compound is mixed therewith and injected thereinto, or an excessive amount of phosphoric compound is injected thereinto, a catalytic activity may not be decreased.

The stabilizer may be known phosphoric compounds containing a phosphorus (P) atom. An example of the phosphoric compound may include trimethyl phosphate, triethyl phosphate, triphenyl phosphate, phosphoric acid, phenylphosphine, 2-carboxylicethylphenyl phosphinic acid, or the like, but the present invention is not limited thereto.

The phosphorus compound may be added so that the phosphorus atom has a content of about 20 ppm or more, for example, about 20 to about 200 ppm, preferably, about 40 to about 180 ppm, more preferably, about 40 to about 160 ppm, based on the polyester. It is preferred to add the phosphoric compound within the above-described range in view of prevention an increase in viscosity and pyrolysis in the polyester polymerization. Other phosphoric compounds may be used within a range not hindering the object of the present invention.

In addition, according to an exemplary embodiment of the present invention, a toning agent may be additionally added to improve color. An example of the toning agent may include a compound containing cobalt, such as cobalt acetate, cobalt acetylacetonate, cobalt benzoylacetonate, cobalt hydroxide, cobalt bromide, cobalt chloride, cobalt iodide, cobalt fluoride, cobalt cyanide, cobalt nitrate, cobalt sulfate, cobalt selenide, cobalt phosphate, cobalt oxide, cobalt thiocyanate, cobalt propionate, or the like, but the present invention is not limited thereto.

The toning agent may be added so that a cobalt atom has a content of about 150 ppm or less, for example, about 30 to about 150 ppm, preferably, about 60 to about 100 ppm, based on the polyester. It is known that the cobalt compound itself has some degree of catalytic activity; however, when an excessive amount of the cobalt compound is added so that the catalytic effect is shown, residual metals in the polyester are increased, such that toxicity may be induced and brightness may be deteriorated. Therefore, when adding the cobalt compound within the above-described range, staining may be inhibited without causing the brightness and thermal stability of the polyester from being deteriorated.

In addition, the adding of the cobalt compound in the present invention may be performed at any step without being limited to the esterifying of the dicarboxylic acid component including the terephthalic acid and the glycol component or the polycondensing of the reaction product obtained by the esterification reaction. In addition, other cobalt compounds may be used within a range not hindering the object of the present invention.

According to the method of preparing the polyester of the present invention, the polyester may be formed by liquid phase polymerization, and wherein the formed polyester may have an intrinsic viscosity ranging from about 0.60 to about 0.65 dl/g.

According to the method of preparing the polyester of the present invention, the polyester may be formed by liquid phase polymerization, and wherein the formed polyester may have an intrinsic viscosity ranging from about 0.70 to about 0.87 dl/g.

The polyester prepared by the method of preparing the polyester of the present invention may have a number average molecular weight of about 10,000 to about 200,000 g/mol, preferably, about 10,000 to about 100,000 g/mol, more preferably, about 12,000 to about 50,000 g/mol.

The polyester prepared by the method of preparing the polyester of the present invention may preferably be polyethylene terephthalate. In addition, the use of the polyester is not specifically limited, but in particular, the polyester may be widely used to a food packing material, a bottle, a film, or a fibrous plastic requiring excellent transparency, brightness, and color conditions.

Hereinafter, the present invention will be described in detail with reference to the following Examples according to the present invention. Meanwhile, the Examples are provided only to illustrate the present invention, and the scope of the invention is not limited thereto.

EXAMPLE

Experimental Conditions

Synthesis of the metal oxide catalyst in Examples was performed in the air, and a general synthesis method was used.

General alcoholic solvents as a reaction solvent for the synthesis were used. Titanium isopropoxide, aluminum isopropoxide, magnesium methoxide, cobalt acetate, triethyl phosphate, terephthalic acid, ethylene glycol, and the like, were used without specific purification process.

Preparation of Complex Metal Oxide

Example 1

4.5 mL (15.19 mmol) of titanium isopropoxide and 0.5 mg (2.45 mmol) of aluminum isopropoxide were dissolved in 70 mL of ethanol by applying heat thereto. 2.5 mL of magnesium methoxide (6 to 7 wt % in methanol) was slowly injected thereto by using a syringe. Then, a solution diluted by mixing 2.5 g of distilled water with 3 mL of ethanol was slowly added dropwise thereto at room temperature (23° C.) for 30 minutes.

The mixture was stirred for 1 hour to obtain a white precipitate, the white precipitate was filtered by using a glass filter to collect a solid, and a residue which was derived in the air was washed with distilled water (10 mL×2) and washed again with ethanol (20 mL×2).

A resulting product was dried in a vacuum state at 70 to 80° C. for 8 hours, to obtain 2.7 g of a complex metal oxide.

FIG. 1 is a photograph of the complex metal oxide obtained by Example 1 of the present invention. Referring to FIG. 1, a coprecipitate of a titanium-aluminum-magnesium complex metal oxide was obtained as a white powder.

The obtained resulting product was analyzed by Inductively Coupled Plasma (ICP; Device's Model Name: Thermo-Elemental X-series) and X-Ray Fluorescence Spectrometry (XRF; Devices' Model Name: ZSX-Primus 2), and as a result, it was confirmed that all of titanium, aluminum, magnesium were contained.

Comparative Example 1

4.5 mL (15.19 mmol) of titanium isopropoxide and 0.5 mL (2.24 mmol) of tetraethylorthosilicate were diluted with 30 mL of ethanol. Then, a solution diluted by mixing 3 g of distilled water with 3 mL of ethanol was slowly added dropwise thereto at room temperature (23° C.) for 30 minutes.

The mixture was stirred for 1 hour to obtain a white precipitate, the white precipitate was filtered by using a glass filter to collect a solid, and a residue which was derived in the air was washed with distilled water (10 mL×2) and washed again with ethanol (20 mL×2).

A resulting product was dried in a vacuum state at 70 to 80° C. for 8 hours.

Comparative Example 2

4.5 mL (15.19 mmol) of titanium isopropoxide was dissolved in 60 mL of ethanol, and diluted by adding 2.5 mL of magnesium methoxide (6 to 7 wt % in methanol) thereto. Then, a solution diluted by mixing 3 g of distilled water with 3 mL of ethanol was slowly added dropwise thereto at room temperature (23° C.) for 30 minutes.

The mixture was stirred for 1 hour to obtain a white precipitate, the white precipitate was filtered by using a glass filter to collect a solid, and a residue which was derived in the air was washed with distilled water (10 mL×2) and washed again with ethanol (20 mL×2). A resulting product was dried in a vacuum state at 70 to 80° C. for 8 hours.

Comparative Example 3

0.5 mg (2.45 mmol) of aluminum isopropoxide was dissolved in 70 mL of ethanol by applying heat thereto, and then diluted by adding 4.5 mL (15.19 mmol) of titanium isopropoxide thereto. A solution diluted by mixing 2.5 g of distilled water with 3 mL of ethanol was slowly added dropwise thereto at room temperature (23° C.) for 30 minutes.

The mixture was stirred for 1 hour to obtain a white precipitate, the white precipitate was filtered by using a glass filter to collect a solid, and a residue which was derived in the air was washed with distilled water (10 mL×2) and washed again with ethanol (20 mL×2). A resulting product was dried in a vacuum state at 70 to 80° C. for 8 hours.

Preparation of Polyester

Example 2

14.5 Kg (87.3 mol) of terephthalic acid, 6.42 Kg (105.75 mol) of monoethylene glycol, 0.448 Kg (3 mol) of isophthalic acid, 1.73 g (100 ppm) of cobalt acetate, and 300 mg of the complex metal oxide catalyst of Example 1 above were dissolved in 100 g of monoethylene glycol, then injected into a reactor, followed by stirring and heating to increase a temperature from room temperature to 250° C., and an esterification reaction was performed for 3 hours.

When a temperature of a tower temperature sensor connected to the reactor to measure water generated and distilled during the reaction was decreased from 250 to 135° C., the reaction was stopped, and bis-hydroxyethylene terephthalate (BHET) prepared by the esterification reaction was moved through a tube to a polycondensation reactor. Here, 300 mg of the complex metal oxide catalyst of Example 1 above, 3.1 g of triethyl phosphate, 1.729 g of cobalt acetate, and organic dye (Toner: blue=0.138 g; red=0.069 g) were dissolved in 200 g of monoethylene glycol, then injected thereinto, a pressure of the polycondensation reactor was reduced from 28 to 0.5 torr for 60 minutes, and at the same time, a temperature was increased up to 250 to 285° C. In this state, the polycondensation reaction was performed for 2 hours, and when an inner temperature of the reactor was decreased from 285 to 265° C., and at the same time a rate of a stirrer installed in the reactor was decreased from 0.64 to 0.52, the reaction was stopped to obtain polyethylene terephthalate.

The obtained polyethylene terephthalate had an intrinsic viscosity of 0.60 dl/g or more, and a number average molecular weight of 15,300 to 20,400 g/mol. The reaction product of which the reaction was completed was pulverized by a coolant and a pelletizer to obtain 10 kg of a transparent polyethylene terephthalate pellet, and process conditions were summarized and shown in the following Table 1.

Example 3

A polyethylene terephthalate resin obtained by the liquid phase polymerization of Example 2 was dried in the air to remove moisture. The resin was put into a solid phase polymerization device, nitrogen was supplied at a temperature of 210° C., and heat was applied thereto for 24 hours for reaction. After the reaction was completed, a polyethylene terephthalate pellet having a crystalline structure as a white solid compound form having viscosity in which a product is capable of being molded, having an intrinsic viscosity of 0.76 dl/g or more, and a number average molecular weight of 32,600 to 35,200 g/mol, was obtained, and process conditions were summarized and shown in the following Table 1.

Example 4

A polyethylene terephthalate pellet having a number average molecular weight of 14,600 to 21,000 g/mol was obtained by performing the polycondensation reaction as the same as Example 2 above except that an injection amount and an injection step of the complex metal oxide, and an amount of triethyl phosphate are different from those of Example 2 above, and process conditions were summarized and shown in the following Table 1.

Example 5

The polyethylene terephthalate obtained by liquid phase polymerization of Example 4 was subjected to solid phase polymerization as the same as Example 3 above to obtain a polyethylene terephthalate pellet having a crystalline structure and a number average molecular weight of 30,500 to 34,200 g/mol, and process conditions were summarized and shown in the following Table 1.

Example 6

A polyethylene terephthalate pellet having a number average molecular weight of 15,500 to 19,800 g/mol was obtained by performing the polycondensation reaction as the same as Example 2 above except that an injection amount and an injection step of the complex metal oxide, and an amount of triethyl phosphate are different from those of Example 2 above, and process conditions were summarized and shown in the following Table 1.

Example 7

The polyethylene terephthalate obtained by liquid phase polymerization of Example 6 was subjected to solid phase polymerization as the same as Example 3 above to obtain a polyethylene terephthalate pellet having a crystalline structure and a number average molecular weight of 29,000 to 33,400 g/mol, and process conditions were summarized and shown in the following Table 1.

Example 8

A polyethylene terephthalate pellet having a number average molecular weight of 15,600 to 19,900 g/mol was obtained by performing the polycondensation reaction as the same as Example 2 above except that an injection amount and an injection step of the complex metal oxide, and an amount of triethyl phosphate are different from those of Example 2 above, and process conditions were summarized and shown in the following Table 1.

Example 9

The polyethylene terephthalate obtained by liquid phase polymerization of Example 8 was subjected to solid phase polymerization as the same as Example 3 above to obtain a polyethylene terephthalate pellet having a crystalline structure and a number average molecular weight of 31,000 to 33,200 g/mol, and process conditions were summarized and shown in the following Table 1.

Example 10

A polyethylene terephthalate pellet having a number average molecular weight of 14,900 to 21,000 g/mol was obtained by performing the polycondensation reaction as the same as Example 2 above except that an amount of triethyl phosphate is different from that of Example 2 above, and process conditions were summarized and shown in the following Table 1.

Example 11

The polyethylene terephthalate obtained by liquid phase polymerization of Example 10 was subjected to solid phase polymerization to obtain a polyethylene terephthalate pellet having a crystalline structure and a number average molecular weight of 29,000 to 33,400 g/mol, and process conditions were summarized and shown in the following Table 1.

Example 12

A polyethylene terephthalate pellet having a number average molecular weight of 15,200 to 20,800 g/mol was obtained by performing the polycondensation reaction as the same as Example 2 above except that an injection amount and an injection step of the complex metal oxide, and an amount of triethyl phosphate are different from those of Example 2 above, and process conditions were summarized and shown in the following Table 1.

Example 13

The polyethylene terephthalate obtained by liquid phase polymerization of Example 12 was subjected to solid phase polymerization as the same as Example 3 above to obtain a polyethylene terephthalate pellet having a crystalline structure and a number average molecular weight of 31,000 to 34,600 g/mol, and process conditions were summarized and shown in the following Table 1.

Example 14

A polyethylene terephthalate pellet having a number average molecular weight of 15,500 to 21,400 g/mol was obtained by performing the polycondensation reaction as the same as Example 2 above except that an injection amount of the complex metal oxide is different from that of Example 2 above, and process conditions were summarized and shown in the following Table 1.

Example 15

The polyethylene terephthalate obtained by liquid phase polymerization of Example 14 was subjected to solid phase polymerization as the same as Example 3 above to obtain a polyethylene terephthalate pellet having a crystalline structure and a number average molecular weight of 31,000 to 34,400 g/mol, and process conditions were summarized and shown in the following Table 1.

Example 16

A polyethylene terephthalate pellet having a number average molecular weight of 14,700 to 20,800 g/mol was obtained by performing the polycondensation reaction as the same as Example 2 above except that an injection amount of the complex metal oxide is different from that of Example 2 above, and process conditions were summarized and shown in the following Table 1.

Example 17

The polyethylene terephthalate obtained by liquid phase polymerization of Example 16 was subjected to solid phase polymerization as the same as Example 3 above to obtain a polyethylene terephthalate pellet having a crystalline structure and a number average molecular weight of 28,000 to 35,400 g/mol, and process conditions were summarized and shown in the following Table 1.

Example 18

A polyethylene terephthalate pellet having a number average molecular weight of 15,700 to 21,400 g/mol was obtained by performing the polycondensation reaction as the same as Example 2 above except that an amount of triethyl phosphate is different from that of Example 2 above, and process conditions were summarized and shown in the following Table 1.

Example 19

The polyethylene terephthalate obtained by liquid phase polymerization of Example 18 was subjected to solid phase polymerization as the same as Example 3 above to obtain a polyethylene terephthalate pellet having a crystalline structure and a number average molecular weight of 31,000 to 34,700 g/mol, and process conditions were summarized and shown in the following Table 1.

Example 20

A polyethylene terephthalate pellet having a number average molecular weight of 16,000 to 19,000 g/mol was obtained by performing the polycondensation reaction as the same as Example 2 above except that an injection amount and an injection step of the complex metal oxide, and an amount of triethyl phosphate are different from those of Example 2 above, and process conditions were summarized and shown in the following Table 1.

Example 21

The polyethylene terephthalate obtained by liquid phase polymerization of Example 20 was subjected to solid phase polymerization as the same as Example 3 above to obtain a polyethylene terephthalate pellet having a crystalline structure and a number average molecular weight of 31,100 to 34,400 g/mol, and process conditions were summarized and shown in the following Table 1.

Example 22

A polyethylene terephthalate pellet having a number average molecular weight of 15,400 to 19,000 g/mol was obtained by performing the polycondensation reaction as the same as Example 2 above except that an injection amount and an injection step of the complex metal oxide, and an amount of triethyl phosphate are different from those of Example 2 above, and process conditions were summarized and shown in the following Table 1.

Example 23

The polyethylene terephthalate obtained by liquid phase polymerization of Example 22 was subjected to solid phase polymerization as the same as Example 3 above to obtain a polyethylene terephthalate pellet having a crystalline structure and a number average molecular weight of 31,400 to 35,800 g/mol, and process conditions were summarized and shown in the following Table 1.

Example 24

A polyethylene terephthalate pellet having a number average molecular weight of 15,700 to 19,000 g/mol was obtained by performing the polycondensation reaction as the same as Example 2 above except that an injection amount and an injection step of the complex metal oxide, and an amount of triethyl phosphate are different from those of Example 2 above, and process conditions were summarized and shown in the following Table 1.

Example 25

The polyethylene terephthalate obtained by liquid phase polymerization of Example 24 was subjected to solid phase polymerization as the same as Example 3 above to obtain a polyethylene terephthalate pellet having a crystalline structure and a number average molecular weight of 31,000 to 36,100 g/mol, and process conditions were summarized and shown in the following Table 1.

Comparative Example 4

The polycondensation as the same as Example 2 above except for using Ti/Si coupled oxide of Comparative Example 1 as a catalyst rather than using the complex metal oxide catalyst of Example 1 above was attempted. However, a reaction rate was significantly slow, and polyethylene terephthalate was not capable of being obtained.

Comparative Example 5

The polycondensation as the same as Example 2 above except for using Ti/Mg coupled oxide of Comparative Example 2 as a catalyst rather than using the complex metal oxide catalyst of Example 1 above was attempted. However, a reaction rate was significantly slow, and polyethylene terephthalate was not capable of being obtained.

Comparative Example 6

The polycondensation as the same as Example 2 above except for using Ti/Al coupled oxide of Comparative Example 3 as a catalyst rather than using the complex metal oxide catalyst of Example 1 above was attempted. However, a reaction rate was significantly slow, and polyethylene terephthalate was not capable of being obtained.

Comparative Example 7

The polycondensation as the same as Example 2 above except for using an antimony oxide ($Sb_2O_3$) catalyst rather than using the complex metal oxide catalyst of Example 1 above was performed to obtain a polyethylene terephthalate pellet, and process conditions were summarized and shown in the following Table 1.

TABLE 1

| Example Nos. | Polymerization Method | Metal Element Total Content (Unit: ppm) | Step 1 (Esterification Reaction) | | Step 2 (Polycondensation Reaction) | | Injection Amount of TEP (Unit: ppm) |
|---|---|---|---|---|---|---|---|
| | | | Injection Amount of Catalyst (Unit: g) | Reaction Time (Unit: hr) | Injection Amount of Catalyst (Unit: g) | Reaction Time (Unit: hr) | |
| Example 2 | Liquid Phase Polymerization | Ti = 14, Al = 0.8, Mg = 0.8 | 0.3 | 3.0 | 0.3 | 2.0 | 180 |
| Example 3 | Solid Phase Polymerization | Same as Example 2 | Same as Example 2 | Same as Example 2 | Same as Example 2 | Same as Example 2 | Same as Example 2 |
| Example 4 | Liquid Phase Polymerization | Ti = 9.3, Al = 0.5, Mg = 0.5 | 0.4 | 3.22 | 0 | 2.56 | 75 |
| Example 5 | Solid Phase Polymerization | Same as Example 4 | Same as Example 4 | Same as Example 4 | Same as Example 4 | Same as Example 4 | Same as Example 4 |
| Example 6 | Liquid Phase Polymerization | Ti = 9.3, Al = 0.5, Mg = 0.5 | 0.2 | 3.47 | 0.2 | 2.19 | 80 |
| Example 7 | Solid Phase Polymerization | Same as Example 6 | Same as Example 6 | Same as Example 6 | Same as Example 6 | Same as Example 6 | Same as Example 6 |
| Example 8 | Liquid Phase Polymerization | Ti = 11.7, Al = 0.7, Mg = 0.7 | 0.2 | 3.47 | 0.3 | 2.45 | 140 |
| Example 9 | Solid Phase Polymerization | Same as Example 8 | Same as Example 8 | Same as Example 8 | Same as Example 8 | Same as Example 8 | Same as Example 8 |
| Example 10 | Liquid Phase Polymerization | Ti = 14, Al = 0.8, Mg = 0.8 | 0.3 | 3.29 | 0.3 | 1.53 | 80 |
| Example 11 | Solid Phase Polymerization | Same as Example 10 | Same as Example 10 | Same as Example 10 | Same as Example 10 | Same as Example 10 | Same as Example 10 |
| Example 12 | Liquid Phase Polymerization | Ti = 16.3, Al = 0.9, Mg = 0.9 | 0.3 | 3.56 | 0.4 | 2.21 | 160 |

TABLE 1-continued

| Example Nos. | Polymerization Method | Metal Element Total Content (Unit: ppm) | Step 1 (Esterification Reaction) Injection Amount of Catalyst (Unit: g) | Step 1 Reaction Time (Unit: hr) | Step 2 (Polycondensation Reaction) Injection Amount of Catalyst (Unit: g) | Step 2 Reaction Time (Unit: hr) | Injection Amount of TEP (Unit: ppm) |
|---|---|---|---|---|---|---|---|
| Example 13 | Solid Phase Polymerization | Same as Example 12 | Same as Example 12 | Same as Example 12 | Same as Example 12 | Same as Example 12 | Same as Example 12 |
| Example 14 | Liquid Phase Polymerization | Ti = 16.3, Al = 0.9, Mg = 0.9 | 0.3 | 3.47 | 0.4 | 2.14 | 180 |
| Example 15 | Solid Phase Polymerization | Same as Example 14 | Same as Example 14 | Same as Example 14 | Same as Example 14 | Same as Example 14 | Same as Example 14 |
| Example 16 | Liquid Phase Polymerization | Ti = 11.7, Al = 0.7, Mg = 0.7 | 0.3 | 3.51 | 0.2 | 3.24 | 180 |
| Example 17 | Solid Phase Polymerization | Same as Example 16 | Same as Example 16 | Same as Example 16 | Same as Example 16 | Same as Example 16 | Same as Example 16 |
| Example 18 | Liquid Phase Polymerization | Ti = 14, Al = 0.8, Mg = 0.8 | 0.3 | 3.37 | 0.3 | 2.33 | 160 |
| Example 19 | Solid Phase Polymerization | Same as Example 18 | Same as Example 18 | Same as Example 18 | Same as Example 18 | Same as Example 18 | Same as Example 18 |
| Example 20 | Liquid Phase Polymerization | Ti = 9.3, Al = 0.5, Mg = 0.5 | 0 | 4.36 | 0.4 | 3.32 | 180 |
| Example 21 | Solid Phase Polymerization | Same as Example 20 | Same as Example 20 | Same as Example 20 | Same as Example 20 | Same as Example 20 | Same as Example 20 |
| Example 22 | Liquid Phase Polymerization | Ti = 14, Al = 0.8, Mg = 0.8 | 0 | 4.37 | 0.6 | 2.28 | 180 |
| Example 23 | Solid Phase Polymerization | Same as Example 22 | Same as Example 22 | Same as Example 22 | Same as Example 22 | Same as Example 22 | Same as Example 22 |
| Example 24 | Liquid Phase Polymerization | Ti = 16.3, Al = 0.9, Mg = 0.9 | 0 | 4.30 | 0.7 | 2.15 | 180 |
| Example 25 | Solid Phase Polymerization | Same as Example 24 | Same as Example 24 | Same as Example 24 | Same as Example 24 | Same as Example 24 | Same as Example 24 |
| Comparative Example 4 | Liquid Phase Polymerization | Ti = 14, Si = 0.8 | Polymerization reaction did not proceed | | | | 180 |
| Comparative Example 5 | Liquid Phase Polymerization | Ti = 14, Mg = 0.8 | Polymerization reaction did not proceed | | | | 180 |
| Comparative Example 6 | Liquid Phase Polymerization | Ti = 14, Al = 0.8 | Polymerization reaction did not proceed | | | | 180 |
| Comparative Example 7 | Liquid Phase Polymerization | Sb = 253 | 0.3 | 3.0 | 0.3 | 2.0 | 180 |

Experimental Example

Measuring Method

Intrinsic Viscosity (IV)

0.4 g of a polyester resin which is a measurement target was added to 100 mL of a reagent obtained by mixing phenol with 1,1,2,2-tetrachloro-ethanol at a weight ratio of 6:4, the mixture was dissolved for 90 minutes, then transferred to an Ubbelohde viscometer, and maintained in a constant temperature bath of 30° C. for 10 minutes. Then, a falling time (second) of the solution was capable of being calculated by a viscometer and an aspirator. A falling time (second) of the solvent was measured by the same method, and R.V. value and I.V. value were calculated by the following Calculation Formulas 1 and 2. In the following Calculation Formulas, C represents a sample concentration.

$$R.V. = \text{Falling Time (sec) of Sample/Falling Time (sec) of Solvent} \quad \text{[Calculation Formula 1]}$$

$$I.V. = \frac{1}{4}(R.V.-1)/C + \frac{3}{4}(\ln R.V./C) \quad \text{[Calculation Formula 2]}$$

Concentration of Carboxylic End Group (CEG, —COOH)

0.5 g of a polyester resin which is measurement target of a size of 4 mm was put into 100 mL of a dissolution tube, and 25 mL of an ortho-chlorophenol solvent was added thereto, followed by dissolution at 100° C. for 1 hour, to prepare a sample. The sample was titrated with 0.02 M KOH methanol solution and measured. The number of carboxylic groups is referred to as equivalent of carboxylic groups/polymer $10^6$ g (or mmol/kg).

Concentration of Hydroxyl End Group (Diethylene Glycol) (DEG, —OH)

0.5 g of a polyester resin which is measurement target of a size of 4 mm was put into 100 mL of a dissolution tube, and 25 mL of an ortho-chlorophenol solvent was added thereto, followed by dissolution at 100° C. for 1 hour, to prepare a sample. An excessive amount (50 mL) of adipic acid was added to the sample, followed by reaction at 100° C. for 1 hour so that a hydroxyl end group was substituted with a carboxylic end group. A remaining adipic acid was removed, then a difference between an amount of the carboxylic end group of the substituted sample and an amount of the carboxylic end group of the unsubstituted sample was calculated.

Color (Color=L, a, b) of Polyethylene Terephthalate Resin

Moisture was removed in the air from 50 g of the polyester resin which is a measurement target, then put into a Colorimeter (model name: SA-2000) to measure color values ten times, and an average value thereof was a standard value.

The L, a, and b color system is a standard for evaluating colors of polyester, which is internationally commonly used. The color numerical value is one of the color systems for standardizing color measurement, which describes recognizable colors and a difference in colors. In this system, L is a brightness factor, and a and b are the number of color measurement. In general, the b value showing yellow/blue balance is an important value in manufacturing a drinking water container, and a food packaging material. A positive b value means yellow discoloration, and a negative b value means blue discoloration. In addition, a positive a value means red discoloration, and a negative a value means green discoloration. Further, L value means a numerical value factor showing brightness, which is also a significantly important numerical value as the b value in manufacturing a drinking water container, and a food packaging material.

Experimental Example 1

Intrinsic viscosity and color values (L, b) depending on the catalysts used in Example 2 and comparative Examples 4 to 7 were measured and shown in the following Table 2.

TABLE 2

| Classification | Polycondensation Time (hr) | Intrinsic Viscosity (IV) | Color Value L | b |
|---|---|---|---|---|
| Example 2 | 2.31 | 0.61 | 50.42 | −0.95 |
| Comparative Example 4 | Polymerization reaction did not proceed. | | | |
| Comparative Example 5 | Polymerization reaction did not proceed. | | | |
| Comparative Example 6 | Polymerization reaction did not proceed. | | | |
| Comparative Example 7 | 2.30 | 0.62 | 52.61 | −1.54 |

As shown in Table 2 above, in the case of using the catalysts of Comparative Examples 4 to 6, when 180 ppm of phosphorus (P) was used as the thermal stabilizer, the polymerization was not achieved at all. It is thought that the reason is because phosphorus (P) contained in the thermal stabilizer easily reacts with the titanium metal contained in the catalyst under high vacuum and high temperature condition to rapidly decrease catalytic activity, such that the polycondensation is not achieved.

However, in the case of the catalyst of the present invention as Example 2 above, the polymerization was satisfactorily achieved even under condition that 180 ppm of phosphorus (P) was used. It is thought that the complex metal oxide catalyst of the present invention has a different compound constitution, which is unlike the existing titanium-based catalyst, and has a stable structure, to thereby have relatively decreased reactivity with phosphorus (P) contained in the thermal stabilizer, such that the polycondensation is satisfactorily achieved even under condition that an excessive amount of phosphoric compound is injected.

In addition, since a general titanium-based catalyst easily and rapidly reacts with the phosphorus (P)-based compound in the polycondensation process, it is general to inject the catalyst and the compound with a time interval to prevent the easy and rapid reaction. However, in the case of the catalyst of the present invention, even though the catalyst of the present invention was mixed with the phosphorus (P)-based compound and injected, a catalytic activity was not decreased.

Experimental Example 2

Polycondensation comparison results depending on the injection step and the catalyst amount of the complex metal oxide catalysts according to Examples 4 to 25 above, and the polycondensation time required for obtaining polyethylene terephthalate depending on the injection amount of thermal stabilizer, the intrinsic viscosity, the color values (L, b, a), the concentration of carboxylic end group (CEG), and the concentration of hydroxyl end group (DEG) were measured and shown in the following Table 3.

TABLE 3

| Example Nos. | Intrinsic Viscosity (IV) | Color L | Color b | Color a | Concentration of CEG (Unit: mmol/Kg) | Concentration of DEG (Unit: wt %) |
|---|---|---|---|---|---|---|
| Example 4 | 0.61 | 48.22 | −2.28 | 0.95 | 63.40 | 2.92 |
| Example 5 | 0.70 | 76.48 | −2.61 | −0.12 | 59.60 | 2.85 |
| Example 6 | 0.62 | 48.46 | −1.66 | 1.27 | 37.80 | 2.96 |
| Example 7 | 0.72 | 77.40 | −2.16 | 0.15 | 29.10 | 2.72 |
| Example 8 | 0.62 | 49.97 | −0.63 | 0.08 | 15.30 | 3.34 |
| Example 9 | 0.77 | 77.25 | −0.44 | −1.02 | 12.80 | 3.01 |
| Example 10 | 0.61 | 49.32 | 0.35 | 0.51 | 9.10 | 2.79 |
| Example 11 | 0.79 | 77.02 | 0.03 | −0.51 | 10.40 | 2.74 |
| Example 12 | 0.62 | 50.87 | 2.25 | 0.10 | 14.20 | 1.72 |
| Example 13 | 0.76 | 75.28 | 1.64 | −0.79 | 13.20 | 1.90 |
| Example 14 | 0.61 | 51.59 | 2.89 | −0.65 | 14.50 | 2.59 |
| Example 15 | 0.77 | 75.18 | 2.51 | −1.37 | 12.40 | 2.50 |
| Example 16 | 0.61 | 51.03 | −0.74 | 0.65 | 28.70 | 3.01 |
| Example 17 | 0.70 | 76.33 | −1.57 | −0.36 | 26.20 | 2.95 |
| Example 18 | 0.62 | 50.85 | −0.61 | 0.15 | 14.20 | 2.94 |
| Example 19 | 0.76 | 76.61 | −0.47 | −0.87 | 10.70 | 2.74 |
| Example 20 | 0.62 | 47.43 | −0.82 | 0.68 | 18.70 | 3.75 |
| Example 21 | 0.72 | 76.60 | −1.73 | −0.30 | 16.80 | 3.74 |
| Example 22 | 0.62 | 50.16 | −2.05 | 0.53 | 19.70 | 4.23 |
| Example 23 | 0.76 | 77.13 | −1.66 | −0.65 | 16.90 | 3.55 |
| Example 24 | 0.62 | 47.78 | 2.88 | −0.64 | 15.20 | 1.45 |
| Example 25 | 0.80 | 75.77 | 2.00 | −1.25 | 13.11 | 1.10 |

As shown in Table 3 above, when the complex metal oxide catalyst of the present invention was injected during only the esterification reaction step, or during only the polycondensation step, like the general antimony catalyst, or during both of the two steps, the requirement time for the polycondensation reaction and physical properties of the produced polyethylene terephthalate were different from each other; however, in all cases, polyethylene terephthalate having generally good physical properties could be obtained.

In addition, the polyethylene terephthalate obtained by the liquid phase polymerization had viscosity of 0.61 to 0.62 dl/g, and the polyethylene terephthalate obtained by the solid phase polymerization had good viscosity of 0.70 to 0.80 dl/g.

What is claimed is:

1. A complex metal oxide used as a catalyst for polyester polymerization, comprising:
one metal (M) selected from the group consisting of magnesium (Mg), zinc (Zn), copper (Cu), manganese (Mn), calcium (Ca), iron (Fe), titanium (Ti), and aluminum (Al).

2. The complex metal oxide of claim 1, comprising titanium alkoxide represented by the following Chemical Formula 1, aluminum alkoxide represented by the following Chemical Formula 2, and a coprecipitate of a metal alkoxide represented by the following Chemical Formula 3:

$Ti(OR^1)_4$  [Chemical Formula 1]

$Al(OR^2)_3$  [Chemical Formula 2]

$M(OR^3)_2$  [Chemical Formula 3]

wherein, in Chemical Formulas 1, 2, and 3, $R^1$, $R^2$, and $R^3$ are each independently, identically or differently, a hydrogen atom, $C_1$ to $C_{20}$ alkyl, $C_2$ to $C_{20}$ alkenyl, $C_3$ to $C_{20}$ cycloalkyl, $C_6$ to $C_{20}$ aryl, $C_1$ to $C_{20}$ alkylsilyl, $C_7$ to $C_{20}$ arylalkyl, or $C_7$ to $C_{20}$ alkylaryl, and wherein, in Chemical Formula 3, M is one metal selected from the group consisting of Mg, Zn, Cu, Mn, Ca, and Fe.

3. The complex metal oxide of claim 2, wherein $R^1$, $R^2$, and $R^3$ are each independently, identically or differently, a hydrogen atom or $C_1$ to $C_4$ alkyl, and wherein M is Mg.

4. The complex metal oxide of claim 1, wherein the complex is represented by the following Chemical Formula 4 or the following Chemical Formula 5:

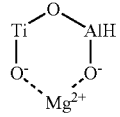

[Chemical Formula 4]

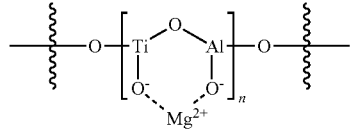

[Chemical Formula 5]

wherein, in Chemical Formula 5, n is an integer of 2 to 20.

5. A method of preparing polyester, comprising:
polymerizing a dicarboxylic acid component including terephthalic acid and a glycol component in the presence of a complex metal oxide including one metal (M) selected from the group consisting of magnesium (Mg), zinc (Zn), copper (Cu), manganese (Mn), calcium (Ca), iron (Fe), titanium (Ti), and aluminum (Al).

6. The method of claim 5, wherein the metal (M) is magnesium (Mg).

7. The method of claim 5, wherein the complex metal oxide comprises titanium alkoxide represented by the following Chemical Formula 1, aluminum alkoxide represented by the following Chemical Formula 2, and a coprecipitate of a metal alkoxide represented by the following Chemical Formula 3:

$Ti(OR^1)_4$  [Chemical Formula 1]

$Al(OR^2)_3$  [Chemical Formula 2]

$M(OR^3)_2$  [Chemical Formula 3]

wherein, in Chemical Formulas 1, 2, and 3, $R^1$, $R^2$, and $R^3$ are each independently, identically or differently, a hydrogen atom, $C_1$ to $C_{20}$ alkyl, $C_2$ to $C_{20}$ alkenyl, $C_3$ to $C_{20}$ cycloalkyl, $C_6$ to $C_{20}$ aryl, $C_1$ to $C_{20}$ alkylsilyl, $C_7$ to $C_{20}$ arylalkyl, or $C_7$ to $C_{20}$ alkylaryl, and wherein in Chemical Formula 3, M is one selected from the group consisting of Mg, Zn, Cu, Mn, Ca, and Fe.

8. The method of claim 7, wherein the complex metal oxide is added so that the titanium (Ti), aluminum (Al), and metal (M) elements contained in the complex metal oxide have a total content of 5 to 200 ppm based on a weight of the polyester.

9. The method of claim 5, wherein the polymerizing of the dicarboxylic acid component including the terephthalic acid and the glycol component comprises:
esterifying the dicarboxylic acid component including the terephthalic acid and the glycol component; and
polycondensing a reaction product produced by the esterification reaction.

10. The method of claim 9, wherein the polycondensing of the reaction product produced by the esterification reaction is performed by injecting a phosphoric compound having a concentration of 20 to 200 ppm based on a content of phosphorus (P) element based on the polyester.

11. The method of claim 10, wherein the polycondensing of the reaction product produced by the esterification reaction is performed by injecting a phosphoric compound having a concentration of 40 to 180 ppm based on a content of phosphorus (P) element based on the polyester.

12. The method of claim 10, wherein the phosphoric compound at least one compound selected from the group consisting of trimethyl phosphate (($CH_3O)_3PO$), triethyl phosphate (($C_2H_5O)_3PO$), triphenyl phosphate (($PhO)_3PO$), and phosphoric acid (($H_3PO_4$)).

13. The method of claim 9, wherein the complex metal oxide is injected into the polycondensation.

14. The method of claim 13, wherein the complex metal oxide is further injected into the esterification reaction.

15. The method of claim 9, wherein the esterifying of the dicarboxylic acid component including the terephthalic acid or an ester-forming derivative thereof, and the glycol component is performed at a temperature of 200 to 300° C. for 2 to 6 hours.

16. The method of claim 9, wherein the polycondensing of the reaction product produced by the esterification reaction is performed at a temperature of 200 to 300° C., under a pressure of 0.1 to 1 torr, for 1 to 5 hours.

17. The method of claim 5, wherein the polymerizing is performed by liquid phase polymerization or solid phase polymerization.

18. The method of claim 17, wherein the polyester is formed by liquid phase polymerization and has an intrinsic viscosity (IV) of 0.60 to 0.65 dl/g,
wherein the intrinsic viscosity (IV) is measured by mixing 60 g of phenol with 40 g of 1,1,2,2-tetrachloro-ethanol to form a solvent mixture and dissolving 0.4 g of the polyester in the solvent mixture at a temperature of 30° C.

19. The method of claim 17, wherein the polyester is formed by solid phase polymerization and has an intrinsic viscosity (IV) of 0.70 to 0.87 dl/g.

20. The method of claim 5, wherein the polyester is used for a food packing material, a bottle, a film, or a fibrous plastic.

21. The method of claim 5, wherein the polyester is polyethylene terephthalate.

* * * * *